United States Patent
Coldren et al.

(10) Patent No.: US 12,326,127 B2
(45) Date of Patent: Jun. 10, 2025

(54) MULTI-FUEL INJECTOR WITH FUEL MIXING

(71) Applicant: Caterpillar Inc., Peoria, IL (US)

(72) Inventors: Dana R. Coldren, Secor, IL (US); Eric L. Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/465,512

(22) Filed: Sep. 12, 2023

(65) Prior Publication Data

US 2025/0084813 A1    Mar. 13, 2025

(51) Int. Cl.
*F02M 43/04* (2006.01)
*F02M 55/02* (2006.01)
*F02M 61/04* (2006.01)

(52) U.S. Cl.
CPC .......... *F02M 43/04* (2013.01); *F02M 55/025* (2013.01); *F02M 61/042* (2013.01)

(58) Field of Classification Search
CPC ..... F02M 43/04; F02M 55/025; F02M 61/042
USPC ...................................... 239/585.1
See application file for complete search history.

(56) References Cited

U.S. PATENT DOCUMENTS

| | | | |
|---|---|---|---|
| 4,691,674 A * | 9/1987 | Otsuka | F02M 59/105 |
| | | | 123/304 |
| 9,188,093 B2 | 11/2015 | Jeon et al. | |
| 9,255,557 B2 | 2/2016 | Park et al. | |
| 10,767,611 B2 | 9/2020 | Meek et al. | |
| 2010/0199948 A1 | 8/2010 | Rogak et al. | |
| 2011/0108631 A1 | 5/2011 | Mumford et al. | |
| 2013/0081593 A1 | 4/2013 | Coldren | |
| 2014/0373806 A1 | 12/2014 | Hou | |
| 2021/0148314 A1 | 5/2021 | Hou | |
| 2022/0243691 A1 | 8/2022 | Schroeder et al. | |

FOREIGN PATENT DOCUMENTS

| | | | | |
|---|---|---|---|---|
| CN | 101506509 A | * | 8/2009 | ........... F02D 19/061 |
| CN | 213807910 U | | 7/2021 | |
| DE | 19715785 A1 | * | 10/1998 | ............. F02M 43/04 |

(Continued)

OTHER PUBLICATIONS

CN-101506509-A (Rogak et al.) (Aug. 12, 2009) (Machine Translation) (Year: 2009).*

(Continued)

*Primary Examiner* — Mahmoud Gimie
(74) *Attorney, Agent, or Firm* — Bookoff McAndrews, PLLC

(57) ABSTRACT

A fuel injector is capable of injecting a plurality of different fuels in a single fuel injection event, the fuel injector including: a nozzle at an end of the fuel injector, the nozzle having a tip, openings in the tip of the nozzle through which fuel is configured to be injected, and a check valve member with a tip located within the nozzle, the check valve member being movable between an injection position in which fuel is injected via the openings and a closed position in which the openings are closed. The fuel injector further includes a primary fuel path within the fuel injector, a pilot fuel path within the fuel injector, and a mixing volume connecting the primary fuel path and the pilot fuel path when the check valve member is in the closed position.

20 Claims, 6 Drawing Sheets

(56) References Cited

FOREIGN PATENT DOCUMENTS

DE    102014225167 A1    6/2016
JP          3368275 B2    1/2003

OTHER PUBLICATIONS

DE-19715785-A1 (Donauer et al.) (Oct. 29, 1998) (Machine Translation) (Year: 1998).*
Written Opinion and International Search Report for Int'l. Patent Appln. No. PCT/US2024/042004, mailed Nov. 11, 2024 (14 pgs).

* cited by examiner

MULTI-FUEL INJECTOR WITH FUEL MIXING

TECHNICAL FIELD

The present disclosure relates generally to methods and systems for internal combustion engine components and, more particularly, to a fuel injector configured to inject two fuels from a single nozzle.

BACKGROUND

While engines that operate entirely by combustion of conventional fossil fuels are commonplace, there is increasing interest in adapting engines for use with so-called "alternative fuels." Examples of alternative fuels include natural gas and alcohol-containing fuels, such as methanol and ethanol, gasoline, or naphtha. Alternative fuels often have a relatively low cetane number and are incompatible with conventional compression ignition (i.e., diesel cycle) engines. These fuels can provide benefits, for example, due to their environmentally-friendly qualities and, in some cases, ability to be generated with renewable sources of energy. However, these fuels introduce challenges due to their combustion qualities and other characteristics, which differ from those of conventional fossil fuels.

In order to control injection of multiple fuel types with a single fuel injector, some injectors are provided with a "dual check" design that include two nozzles with two check valves, or one nozzle with two check valves. These nozzles also contain separate sets of orifices for injecting each type of fuel for use with the pair of check valve members that open and close these respective sets of orifices. These types of injectors, while generally effective, can introduce additional manufacturing complexity and cost. Injectors with dual tips and dual valve members can also involve more complex electrical wiring and control systems.

An exemplary fuel injector for injection of more than one fuel is described in U.S. Patent Application Publication No. 2014/0373806 A1 ("the '806 publication") to Hou. The fuel injector described in the '806 publication includes a needle with an internal fuel passage, as well as a variable fuel injection orifice. The fuel passage within the needle terminates in needle orifices that operate as high pressure fuel passages. These passages are fully sealed when the needle rests in a closed position and therefore, fuel is prevented from mixing within the nozzle. While the fuel injector described in the '806 publication can be useful in some circumstances, it may be difficult to inject one or both types of fuel in a desired quantity or timing via the needle.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a fuel injector may be capable of injecting a plurality of different fuels in a single fuel injection event, the fuel injector including: a nozzle at an end of the fuel injector, the nozzle having a tip, openings in the tip of the nozzle through which fuel is configured to be injected, and a check valve member with a tip located within the nozzle, the check valve member being movable between an injection position in which fuel is injected via the openings and a closed position in which the openings are closed. The fuel injector may further include a primary fuel path within the fuel injector configured to supply a primary fuel to the openings in the tip of the nozzle, a pilot fuel path within the fuel injector configured to supply a pilot fuel to the openings in the tip of the nozzle, and a mixing volume within the nozzle and connecting the primary fuel path and the pilot fuel path when the check valve member is in the closed position.

In another aspect, a fuel injection method may include supplying a pilot fuel to a nozzle of a fuel injector, supplying a primary fuel to the nozzle, the pilot fuel being different than the primary fuel. The fuel injection method may include at least partially mixing the pilot fuel and the primary fuel in the nozzle before either the primary fuel or the pilot fuel is injected with the nozzle, injecting the pilot fuel and the primary fuel through a single set of openings in the nozzle.

In yet another aspect, a fuel injection system may include a first common rail configured to receive a pilot fuel, a second common rail configured to receive a primary fuel, and a fuel injector. The fuel injector may have a nozzle, a check valve member extending within the nozzle, a primary fuel path configured to supply a primary fuel to the nozzle, and a pilot fuel path within the fuel injector configured to supply a pilot fuel to openings in the nozzle, the primary fuel path being fluidly connected to the pilot fuel path when the check valve member is in a closed position that prevents injection of the pilot fuel and injection of the primary fuel.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about,"

"substantially," "generally," and "approximately" are used to indicate a possible variation of ±10% in the stated value or characteristic.

Figure 1:
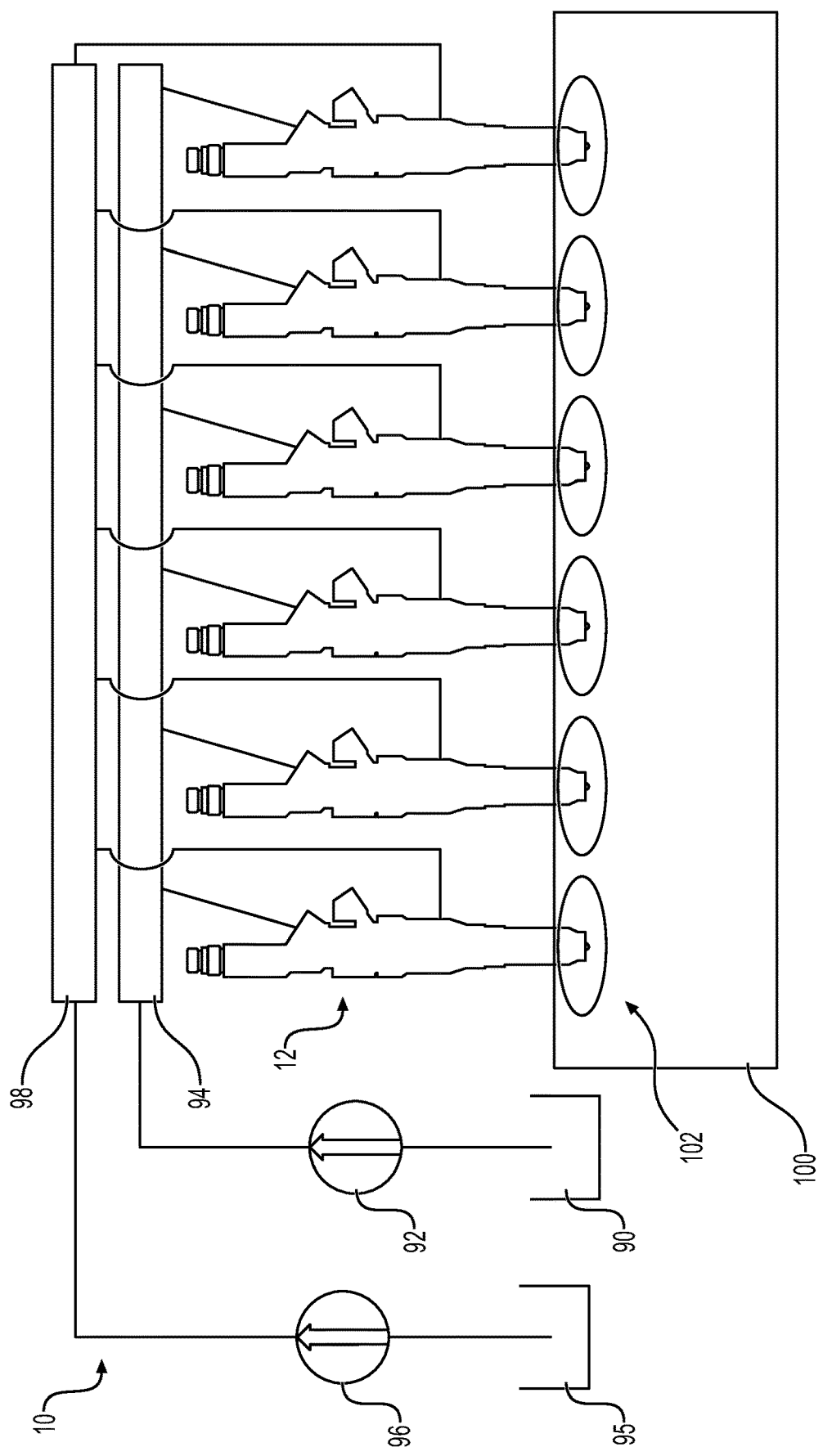
FIG. 1 is a schematic diagram of a multi-fuel engine system, according to aspects of the disclosure.

FIG. 1 illustrates an exemplary multi-fuel engine system 10 including a plurality of fuel injectors 12, according to aspects of the present disclosure. Multi-fuel engine system 10 may include an internal combustion engine 100 with a plurality of engine cylinders 102 to which fuel injectors 12 are connected for direct fuel injection. Multi-fuel engine system 10 may also include a fuel supply system for delivering a plurality of different types of fuels to each injector 12.

The fuel supply system for delivering fuels to injectors 12 may include a pilot fuel reservoir 90 (e.g., a fuel tank), a pilot fuel pump 92, and a common rail 94 downstream of pilot fuel reservoir 90 and primary fuel pump 92. The fuel supply system may further include a primary fuel reservoir 95 for gaseous or liquid primary fuel, a fuel pump 96 (e.g., a cryogenic pump compatible with liquid natural gas or fuel pump compatible with an alcohol-containing liquid fuel) downstream of primary fuel reservoir 95, and a common rail 98 compatible with either gaseous fuel or liquid fuel. Separate flow paths (e.g., including a quill) may connect common rail 94 and common rail 98 to input ports of each injector 12. Common rail 94 and common rail 98 may be connected to sensors, relief valves, and other structures (not shown) that are known in the art of common rail fuel injection systems. Also, pumps 92 and 96 may be connected to an electronic control module (not shown) that is configured to adjust the pressure at which each fuel is supplied to injector 12. The pressure generated with pump 92 and pump 96 may be adjusted by the electronic control module to adjust the relative amounts of pilot fuel and primary fuel injected to cylinders 102.

Fuel injector 12 may be a multi-fuel injector configured to inject two different types of fuel in a single injection event (e.g., an injection event that includes a pilot injection, a main injection, and/or a post injection) via a single nozzle having a shared set of nozzles orifices or openings. In some aspects, these two different fuels may include a liquid fuel and a gaseous fuel or two different liquid fuels. As used herein, whether a fuel is "liquid" or "gaseous" is determined based on the state of the fuel as it is delivered to the fuel injector. A fuel delivered to a fuel injector as a gas can be considered as a gaseous fuel, even if the gaseous fuel is stored in a liquid state. For example, liquid natural gas of reservoir 95 may expand such that rail 98 contains fuel in gaseous form, this gaseous fuel being delivered to injector 12. In this example, natural gas is considered a gaseous fuel. Diesel fuel may be stored in liquid form and supplied in liquid form to injector 12 as a pilot fuel, forming a liquid fuel in this example. As other examples of liquid fuel, liquid methanol or ethanol may be stored and supplied as a primary fuel in liquid form.

As used herein, a "primary" fuel refers to a fuel that, under steady state operating conditions of the internal combustion engine, is injected in a volume that generates more than 50% the total energy resulting from fuel combustion following an injection event that includes a pilot injection (e.g., of diesel fuel, dimethyl ether, biodiesel, vegetable oil, or other pilot fuel) and a main injection (e.g., of natural gas, methanol, ethanol, or other primary fuel). A "pilot fuel" may refer to a fuel that is mostly or entirely injected before the primary fuel in an injection event such that the pilot fuel initiates combustion. In some aspects, a fuel with a relatively low cetane number (e.g., natural gas, methanol, ethanol, etc.) may be used as the primary fuel, and a fuel (e.g., diesel fuel, dimethyl ether, biodiesel, vegetable oil, etc.) with a cetane number that is higher than the cetane number of the primary fuel may be used as the pilot fuel. Additionally, while the terms "pilot fuel" and "primary fuel" correlate to the general order in which these different fuels are injected, as understood, the pilot fuel injection and primary fuel injection may occur continuously, and may include the injection of a mixture of the two fuels.

Figure 2A:
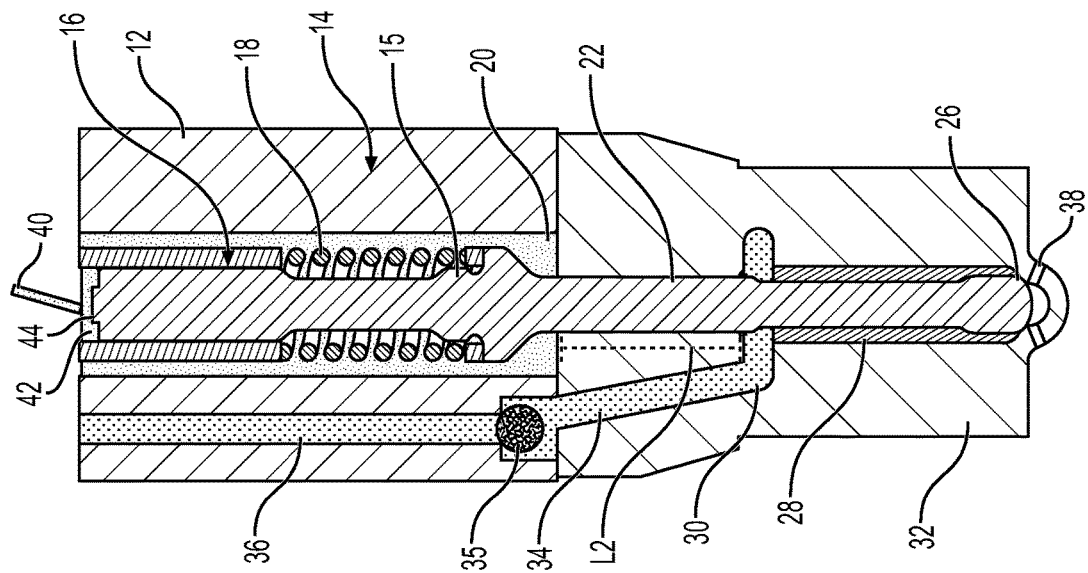
FIG. 2A is a partially-schematic cross-sectional view of an exemplary fuel injector, according to aspects of the present disclosure.

FIG. 2A is a cross-sectional view of an example fuel injector 12. As described below, the injectors shown in FIGS. 2A, 2B, 3A, and 3B may be configured for passive metering control. As used herein, "passive" metering does not involve the actuation of an electronically-controlled valve (e.g., a solenoid valve) in injector 12 to supply a desired (e.g., calculated) quantity of fuel, such as pilot fuel, to a tip of injector 12. As used herein, "active" metering does involve the actuation of an electronically-controlled valve in injector 12 to supply the desired quantity of fuel. These injectors may therefore be provided with only one control valve and solenoid, in contrast with the active metering described below with respect to FIGS. 4 and 5.

Figure 4:
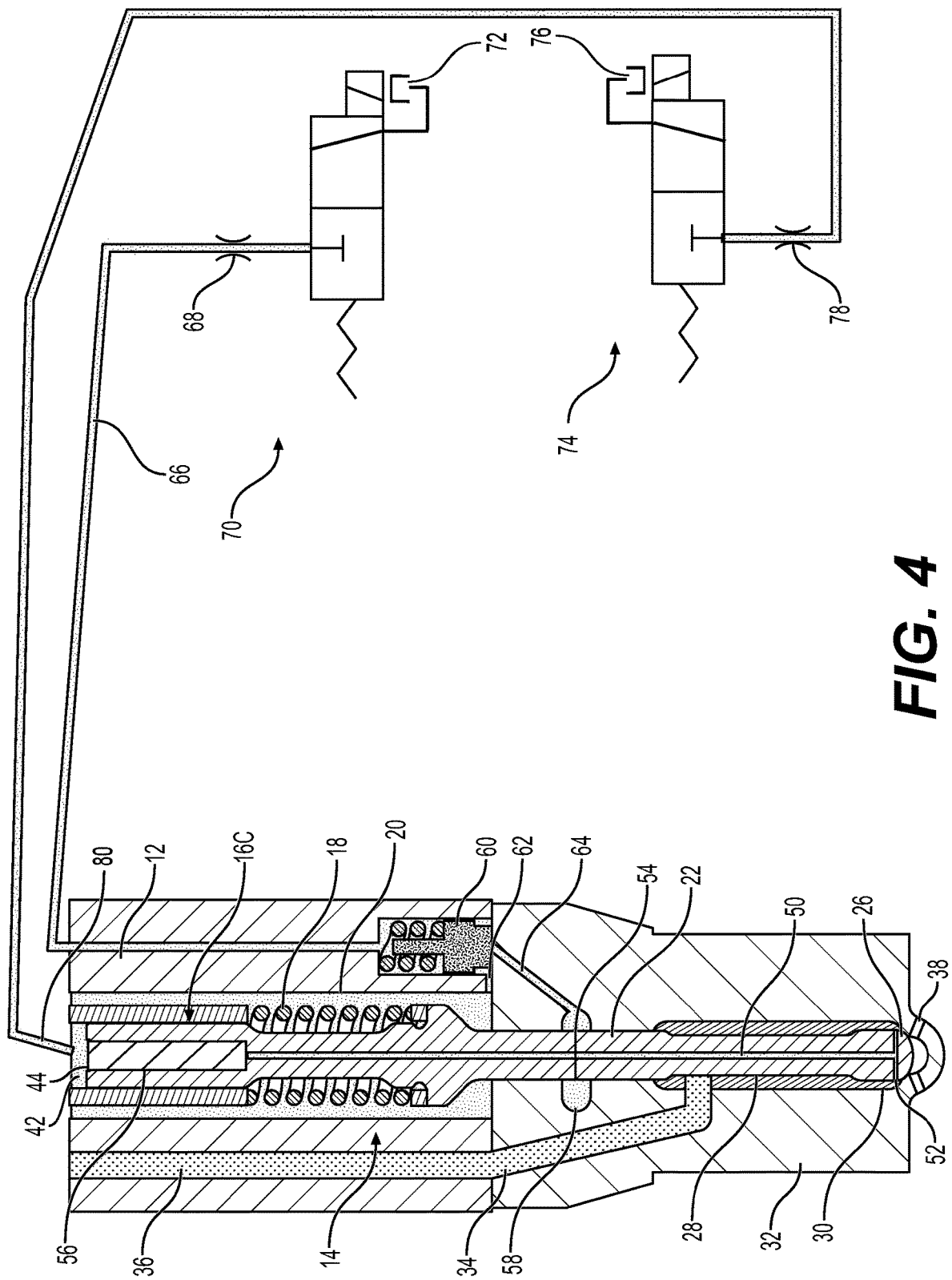
FIG. 4 a partially-schematic cross-sectional view of an exemplary fuel injector.
Figure 5:
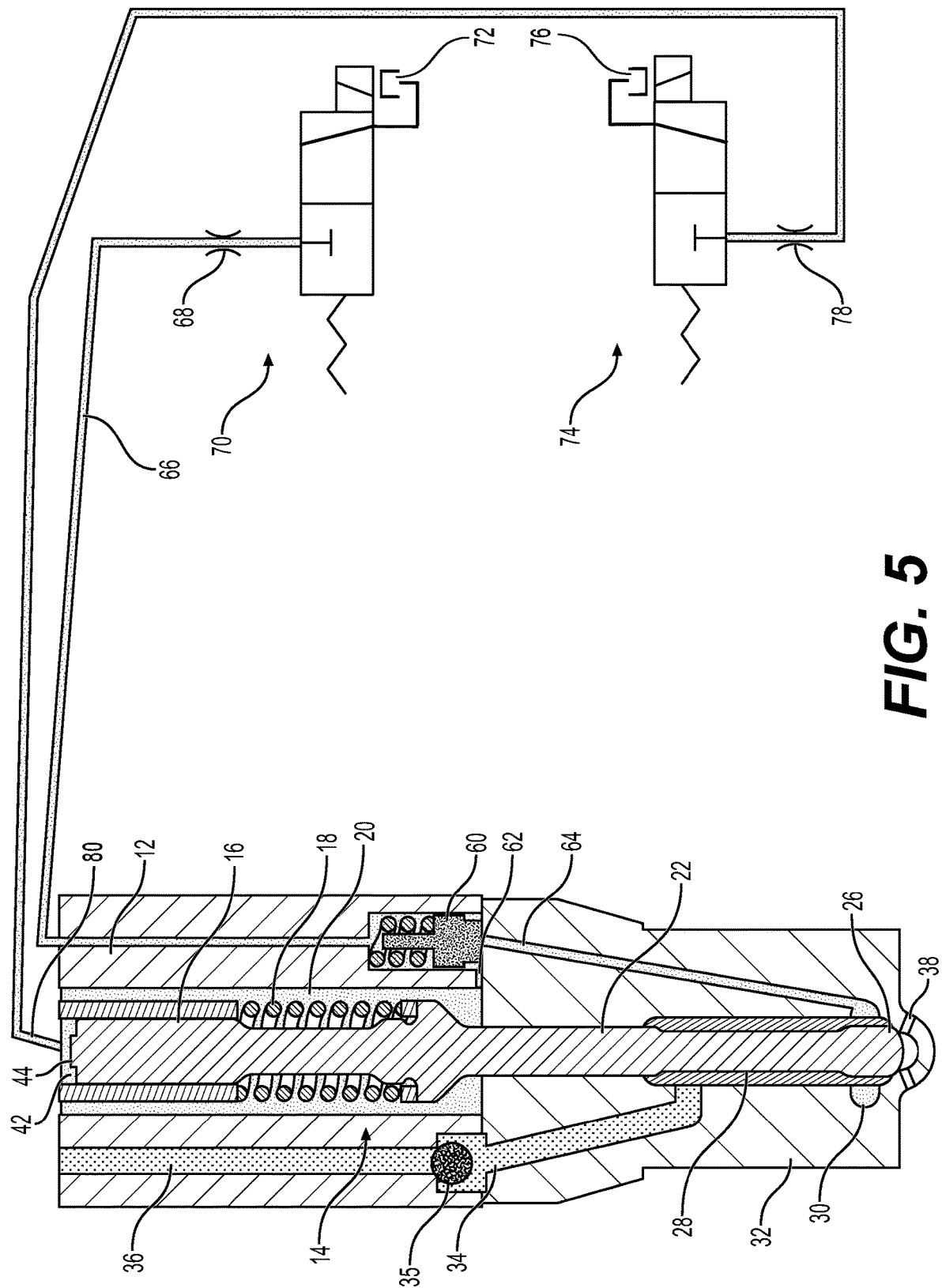
FIG. 5 a partially-schematic cross-sectional view of an exemplary fuel injector.

While FIG. 2A shows a distal portion of fuel injector 12, as understood, fuel injector 12 may include a body that extends proximally from the structure shown in FIG. 2A, and that includes one or more solenoid-controlled valve components (e.g., a valve 74 for initiating fuel injection, as shown in FIGS. 4 and 5), electrical connections for communication with an electronic control unit, fuel inlets, and other structures. Fuel injector 12 may include a check valve 14, a primary fuel supply passage 36, a mixing volume 30, and a nozzle 32 with one or more orifices or nozzle openings 38. Check valve 14 may include a valve member 16, a spring 18 biasing valve member 16 to a closed position, a pilot fuel guide space 22, an enlarged clearance 24, and a hydraulic control chamber 42.

Valve member 16 may include a valve body 15 that extends from a proximal end 44 to a distal end 26. Valve body 15 may be entirely solid to require the introduction of fuel outside of valve member 16, as shown in FIG. 2A for example, or may include one or more internal passages for supplying fuel, as described below. Proximal end 44 may be closest to hydraulic control passage 40 and positioned within a hydraulic control chamber 42. Distal end 26 may be positioned within nozzle 32.

Valve member 16 may be movable between a closed position and an open position. In the closed position, shown in FIG. 2A, distal end 26 forms a seal with a valve seat inside nozzle 32 so as to close nozzle openings 38. In the open position, valve body 15 is lifted so as to place enlarged clearance 24, nozzle fuel passage 34, and mixing volume 30 in communication with nozzle openings 38 such that fuel within clearance 24, passage 34, and mixing volume 30 passes through nozzle openings 38.

In some aspects, fuel injector 12 may define a primary fuel path and a pilot fuel path. The primary fuel path may be partially isolated from the pilot fuel path, and may include primary fuel supply passage 36, nozzle fuel passage 34, and if desired, a one-way valve 35. One-way valve 35 may permit flow from passage 36 to passage 34, while preventing flow in the direction from passage 34 to primary fuel supply passage 36, thus isolating the primary fuel path upstream of valve 35. The primary fuel path may be in fluid communication with, and downstream of, common rail 98.

The pilot fuel path may include a pilot fuel chamber 20, a pilot fuel guide space 22, and enlarged clearance 24. Pilot fuel chamber 20 may be filled with pressurized pilot fuel via one or more supply passages (not shown). Pilot fuel guide space 22 may be formed as an area with a controlled clearance (e.g., spacing) between the outer diameter of valve body 15 and an inner bore of nozzle 32 that surrounds this portion of valve body 15. In some aspects, this controlled clearance may be in a range of about 3 μm to about 8 μm. In some configurations, the pilot fuel path may include passages within valve member 16 and/or other passages within nozzle 32 or other portions of injector 12, as described below (FIGS. 3A-5).

A mixing volume 30 within nozzle 32 represents the location within nozzle 32 where the primary fuel path joins the pilot fuel path, causing the primary fuel path to be in fluid communication with the pilot fuel path. Mixing volume 30 may be a point where fuel from pilot fuel chamber 20 is configured to encounter fuel from primary fuel supply passage 36 within nozzle 32. Mixing of the pilot fuel and primary fuel may be driven or increased by the difference between the pressures of the pilot and primary fuels. For example, as the pilot fuel may generally be present at a higher pressure, this fuel may tend to mix with primary fuel in volume 30, with increased mixing being associated with increasing pressure differences between the two fuels. Higher pilot fuel pressures may therefore be associated with increased mixing.

Mixing volume 30 may be an annular space that surrounds a portion of valve body 15. For example, in the configuration shown in FIG. 2A, mixing volume 30 may surround a portion of distal end 26. If desired, a cross-sectional area defined by mixing volume 30 (e.g., measured as a clearance between valve body 15 and an inner wall of nozzle 32 that defines mixing volume 30) may be larger than a corresponding cross-sectional area of pilot fuel guide space 22. The cross-sectional area of mixing volume 30 may also be larger than that of a tip reservoir 28. Tip reservoir 28 may be defined so as to surround a portion of pilot fuel guide space 22 extending distal of pilot fuel guide space 22.

Figure 2B:
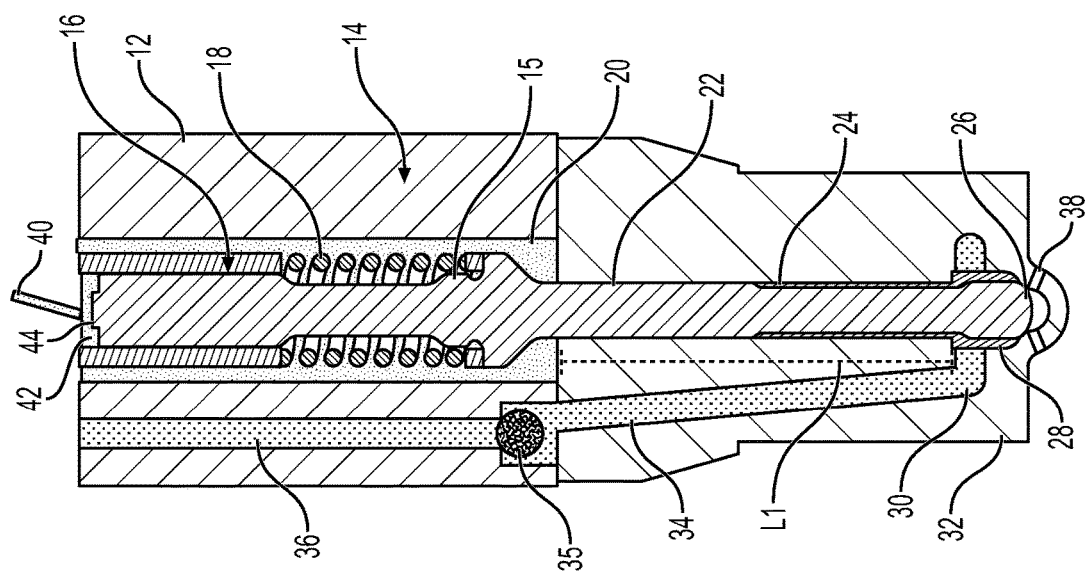
FIG. 2B a partially-schematic cross-sectional view of an exemplary fuel injector.

FIG. 2B is a cross-sectional view of an example fuel injector 12 with structural similarities to injector 12 shown in FIG. 2A. As can been by comparing FIG. 2B with FIG. 2A, nozzle fuel passage 34 may have a shortened configuration that results in mixing volume 30 being located at a more proximal position, spaced away from distal end 26. For example, a location of mixing volume 30 may be related to a distance between an end of pilot fuel chamber 20 to mixing volume 30, which represents a distance pilot fuel travels from pilot fuel chamber 20 to reach mixing volume 30.

In configurations where mixing volume 30 surrounds distal end 26 at the distal end portion of nozzle 32 (FIG. 2A), distance L1 may be relatively large. In configurations where mixing volume 30 is closer to pilot fuel guide space 22 (FIG. 2B), a distance L2 may be smaller than distance L1. While two examples are illustrated in FIGS. 2A and 2B, respectively, as understood, positions of mixing volume 30 may be between the illustrated locations, closer to distal end 26, or closer to pilot fuel chamber 20, if desired. In some aspects, the distance (e.g., the value of distance L1 or L2) may be set based on the desired amount of mixing. For example, using a relatively small distance, such as distance L2, may provide increased mixing in comparison to a relatively large distance, such as distance L1.

Figure 3A:
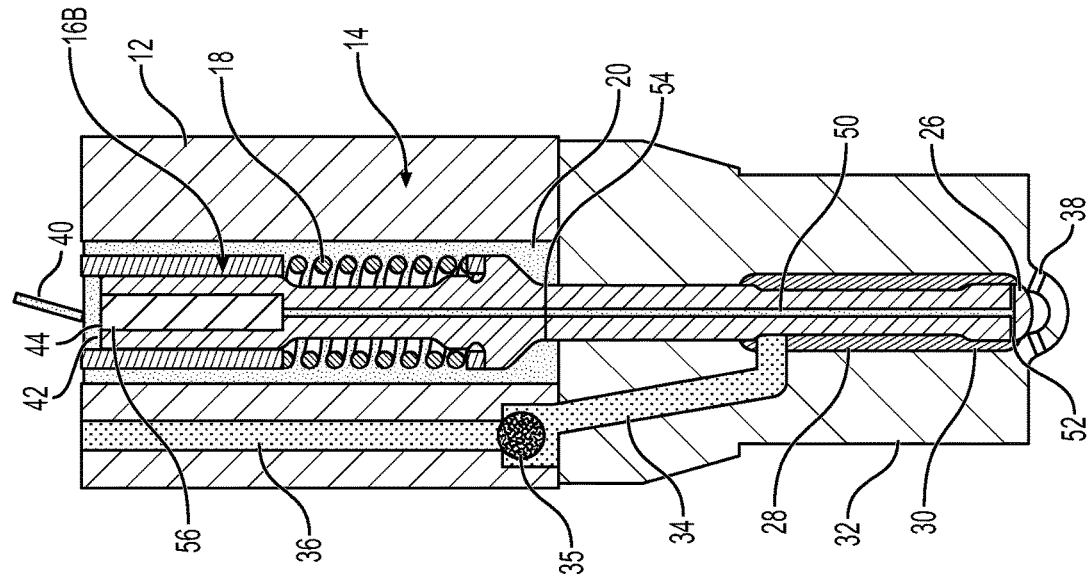
FIG. 3A a partially-schematic cross-sectional view of an exemplary fuel injector.
Figure 3B:
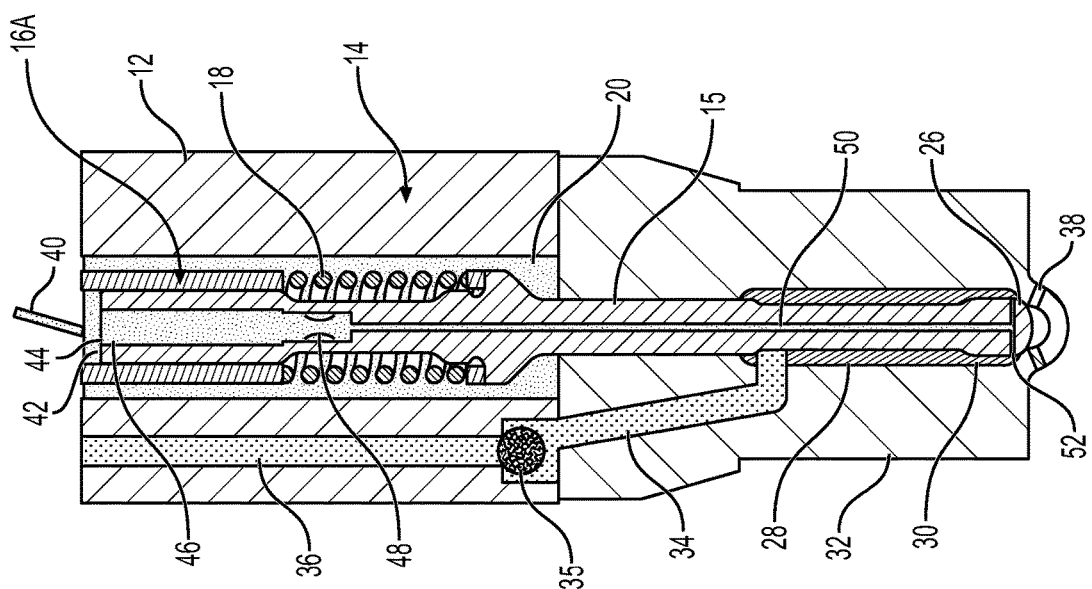
FIG. 3B a partially-schematic cross-sectional view of an exemplary fuel injector.

FIGS. 3A and 3B are cross-sectional views of fuel injector 12 provided with entirely-hollow or partially-hollow valve members, valve member 16A and valve member 16B, respectively. Valve member 16A (FIG. 3A) may be hollow, such that proximal end 44 defines an opening 46 that is configured to receive fuel that enters the hollow interior of valve member 16A. This opening 46 may form a valve member supply through which an interior of valve member 16A receives pilot fuel. Opening 46 may define a portion of the hollow interior of valve member 16A and, in particular, a portion of this hollow interior with the largest internal diameter.

An orifice 48 or other flow restriction may be connected downstream of opening 46 and inside of valve member 16A to aid in regulating flow of fuel to an interior passage 50. For example, orifice 48 may be sized in a manner that reduces velocity of fuel traveling distally from opening 46.

Interior passage 50 may connect opening 46 to one or more fuel exit orifices 52. Orifices 52 may have the smallest diameter among the passages within valve member 16A and may extend through one or multiple side walls of distal end 26. In some examples, fuel exit orifices 52 are sized to perform fuel metering. In particular, the number, size, and orientation of fuel exit orifices 52 may be determined to facilitate localization of pilot fuel in distal end 26. As can be seen in FIGS. 3A and 3B, fuel exit orifices 52 may be formed in distal end 26 such that fuel exit orifices 52 are not blocked when valve check valve 14 is closed or when check valve 14 is open. Thus, orifices 52 may always be in communication with tip reservoir 28. While fuel exit orifices 52 are shown in an orientation that is perpendicular to a longitudinal direction defined by valve member 16A, other configurations are possible. For example, fuel exit orifices 52 may form an oblique angle (e.g., extend at an upward or downward angle) with respect to this longitudinal direction, provided that fuel exit orifices 52 are not blocked by nozzle 32. In some aspects, fuel exit orifices 52 may be angled or offset from valve member 16A. For example, one or more orifices 52 may extend in a direction that is curved or angled and therefore not aligned with a radial direction defined by valve member 16A. This curved or angled orientation may impart a rotational or circumferential motion to the fuel exiting orifices 52 and may tend to cause the pilot fuel to move in a swirling path around distal end 26.

The effect of the clearance between valve body 15 and nozzle 32 (e.g., the region corresponding to pilot fuel guide space 22 in FIGS. 2A and 2B) may be minimized in the configurations shown in FIGS. 3A and 3B by forming a minimal clearance between nozzle 32 and valve body 15, such as a clearance of about 3 μm, or less than about 3 μm. Additionally, the distance of this guide space may be lengthened (e.g., similar to or equal to L1 in FIG. 2A), thereby providing a greater length to diameter ratio for the space between valve body 15 and nozzle 32.

As shown in FIG. 3B, valve member 16B may have a sealed proximal end 44 that blocks flow of fuel from interior passage 50 to proximal end 44. Sealed proximal end 44 may be formed by a seal or plug 56 extending in an interior of valve member 16B. Plug 56 may fill a portion of valve member 16B that was removed to facilitate the formation of interior passage 50 (e.g., by gun drilling, precision electrical discharge machining, or additive manufacturing).

Valve member 16B may include one or more fuel entry orifices 54 that form a valve member supply through which pilot fuel is delivered to interior passage 50. Fuel entry orifices 54 may be positioned within pilot fuel chamber 20 and in fluid communication with chamber 20 such that fuel is supplied to interior passage 50 from pilot fuel chamber 20.

FIG. 4 shows a configuration of fuel injector 12 that includes a valve member 16C, a metering admission valve 60, a metering control valve 70, and an injection control valve 74. Valve member 16C may include a plug 56 or other seal at proximal end 44, interior passage 50, fuel entry orifices 54, and fuel exit orifices 52. Fuel entry orifices 54 may be positioned within nozzle 32 between pilot fuel chamber 20 and distal end 26. This configuration may also place mixing volume 30 at a location adjacent to orifices 52 in distal end 26. In some aspects, this configuration may omit one-way valve 35 between nozzle fuel passage 34 and primary fuel supply passage 36. However, one-way valve 35 may be included in this configuration, if desired.

Control valve 74 may be an electronically-controlled, normally-closed valve that selectively connects a control fluid (e.g., pilot fuel) drain 76 to hydraulic control chamber 42 via a hydraulic drain passage 80 and an orifice 78 that regulates flow velocity. When closed, control valve 74 may facilitate the supply of pressurized fluid from a fluid source (not shown in FIG. 4) to hydraulic chamber 42, this pressurized fluid applying hydraulic pressure to proximal end 44 as described above. When actuated (e.g., energized) and opened, control valve 74 may relieve pressure acting on valve member 16C by connecting fluid drain 76 to hydraulic control chamber 42 via hydraulic drain passage 80. For example, control valve 74 may be connected to drain 76 as diagrammatically shown in FIG. 4 to facilitate the release of pressure from hydraulic control chamber 42.

Metering valve 70 may be an electronically-controlled, normally-closed valve that selectively connects a control fluid (e.g., pilot fuel) drain 72 to metering admission valve 60 via a hydraulic drain passage 66 and an orifice 68. When closed, metering valve 70 may allow pressurized pilot fuel, or another control fluid, to act on a valve member of metering admission valve 60. When actuated (e.g., energized) and opened, metering valve 70 may connect hydraulic drain passage 66 to control fluid drain 72, via hydraulic drain passage 66. Control valve 70 may be connected to drain 72 to facilitate the release of pressure from a surface of valve 60, permitting actuation of valve 60.

Valve 60 may include a valve member that is biased to a closed position (shown in FIG. 4) by a spring. Valve 60 may have an open position in which the valve member is lifted away from passage 64. A connection passage 62 may always be in communication with valve member 60.

The valve member of metering admission valve 60 may have an upper hydraulic surface (e.g., facing the spring in the configuration shown in FIG. 4) that causes metering admission valve 60 to close when high pressure fluid is present. Valve 60 may be configured to open when the pressure of fluid acting on the upper hydraulic surface is reduced (e.g., by relieving pressure via passage 66 and drain 72) and fluid from passage 62 lifts the member of valve 60 by acting on a lower hydraulic surface of valve 60.

When open, valve 60 may facilitate communication between pilot fuel chamber 20 and interior passage 50. For example, when valve 60 is open, fluid may flow to interior passage 50 through a path that includes connection passage 62, supply passage 64, and one or more fuel entry orifices 54.

FIG. 5 is partially schematic cross-sectional view of fuel injector 12 useful with a solid valve member 16 in combination with metering admission valve 60. This configuration, aside from valve member 16, may include the structures described above with respect to FIG. 4. One-way valve 35 may also be included to prevent flow of pilot fuel to passage 36.

As shown in FIG. 5, metering admission valve 60 may be in fluid communication with supply passage 64 such that pilot fuel from pilot fuel chamber 20 flows to supply passage 64 when metering admission valve 60 is open. This fuel may be delivered to a location adjacent to a periphery of the solid valve member 16, such as distal end 26, as shown in FIG. 5, or a location corresponding to mixing volume 30 in FIG. 2B (e.g., when increased mixing of the primary and pilot fuels is desired).

In each of the above-described embodiments (e.g., corresponding to FIGS. 2A-5), pilot fuel may be supplied at a pressure that is higher than the pressure of primary fuel. This may be true in embodiments where the pressures of these fuels change over time. In some aspects, the pressure of pilot fuel may be from about 1 MPa or 50 MPa. Pilot fuel pressures in excess of 50 MPa are also contemplated in at least some embodiments.

In some aspects, configurations including metering admission valve 60 may be capable of operating in a pilot-fuel only mode (e.g., operation under only diesel fuel). This mode may be enabled by increasing the pressure of pilot fuel from a dual-fuel operation level (e.g., about 35 MPa to about 60 MPa) to a single-fuel operation level (e.g., about 220 MPa). This may be achieved via control of pilot fuel pump 92 (FIG. 1). In configurations in which metering admission valve 60 is omitted (e.g., FIGS. 2A-3B) multi-fuel engine system 10 may be configured to operate in a limited mode in which internal combustion engine 100 is operated in a low power state to provide locomotion or other limited operations. The limited mode may be a "limp" mode in which the engine operates solely on pilot fuel, but does not operate at full power.

INDUSTRIAL APPLICABILITY

Multi-fuel engine system 10 and fuel injector 12 may be used with any suitable internal combustion engine. In particular, fuel injector 12 may be used with an engine 100 capable of operating with multiple fuels supplied at the same time. These fuels may be a liquid fuel and a gaseous fuel, or different liquid fuels such as diesel fuel and methanol. Examples of suitable internal combustion engines include engines for stationary machines (e.g., a generator or other electricity-generating device), in mobile machines (e.g., an earthmoving device, a hauling truck, a drilling machine, etc.), or in other applications. The internal combustion engine may generate electrical power, power for propulsion, and/or power for operating one or more implement systems (e.g., via hydraulics).

During one or more injection events, injector 12 may inject pilot fuel and primary fuel to a combustion chamber of an engine cylinder 102. Pilot fuel is supplied to fuel injector 12 by pilot fuel reservoir 90 via pilot fuel pump 92 and common rail 94, while primary fuel is supplied to injector 12 by primary fuel reservoir 95, fuel pump 96, and common rail 98. This fuel may be injected by a single set nozzle orifices 38 in nozzle 32 after at least partially mixing within the injector 12.

Figure 6:
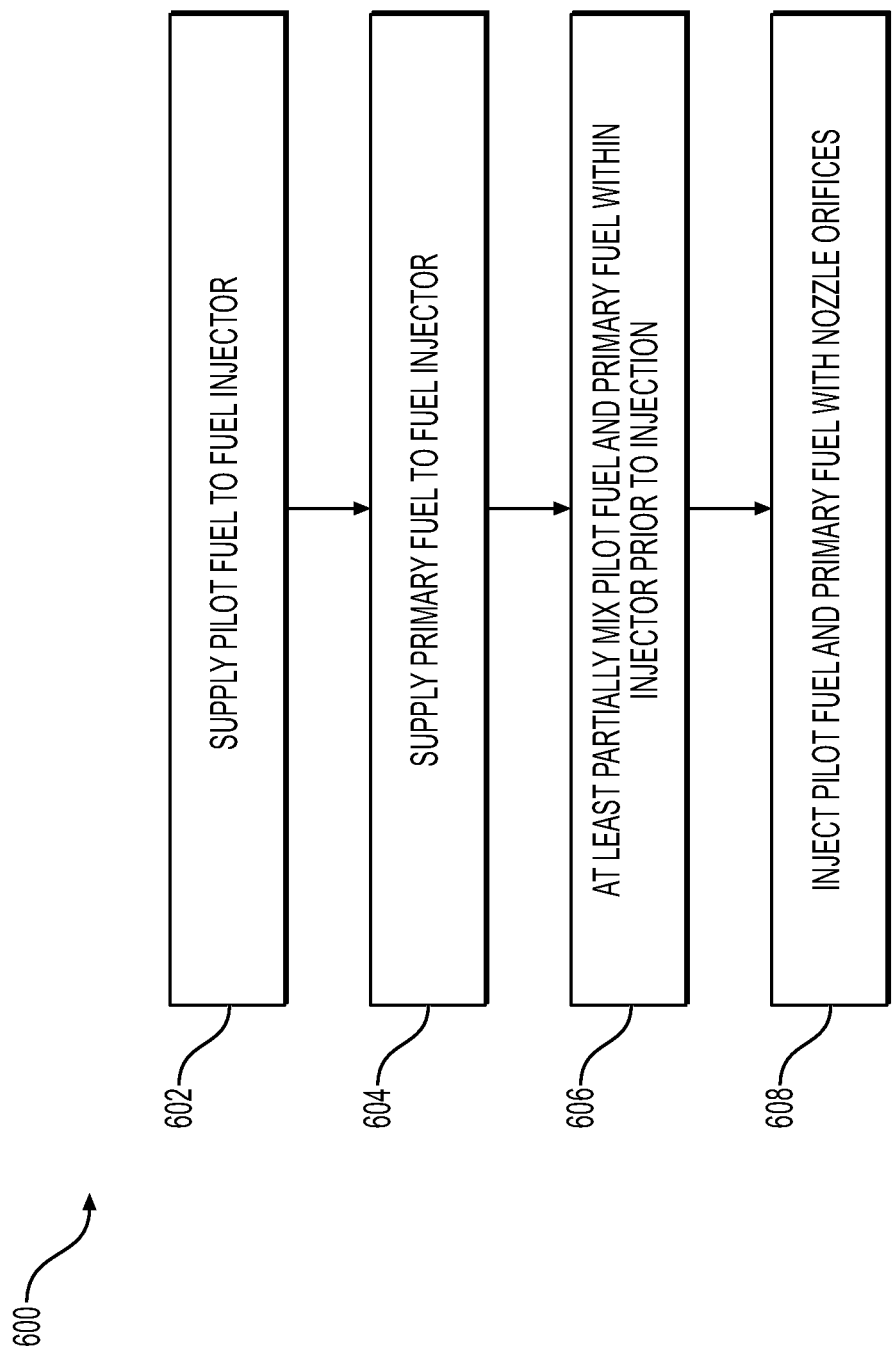
FIG. 6 is a flowchart depicting an exemplary fuel injection method, according to aspects of the disclosure.

FIG. 6 includes a flowchart for an exemplary method 600 that may be performed during the operation of system 10, which includes internal combustion engine 100 and fuel injectors 12. During method 600, pressurized fuel may be received through two separate paths within fuel injector 12. These two paths may include pilot fuel path and a primary fuel path, the two fuel paths being connected by a mixing volume located on the interior of injector 12. The pressurized pilot fuel may displace at least some of the primary fuel within the nozzle tip, causing nozzle 32 to include a relatively high concentration of diesel fuel around distal end 26. This may facilitate the injection of pilot fuel in an amount that initiates ignition (e.g., ignition via compression of diesel fuel) and facilitates complete combustion of the primary fuel at a desired engine timing.

A step 602 of method 600 may include supplying pilot fuel (e.g., liquid diesel fuel) to fuel injector 12. As shown in FIG. 1, pilot fuel may be pumped from pilot fuel reservoir 90 via Pilot fuel pump 92 and supplied to common rail 94. Pilot fuel pump 92 may pressurize the pilot fuel within a range of about 35 MPa to about 60 MPa, as measured within fuel rail 94 or within injector 12.

During step 602, pilot fuel may be supplied to pilot fuel chamber 20 and hydraulic control chamber 42. Pilot fuel may be supplied to mixing volume 30 via pilot fuel guide space 22 (FIGS. 2A, 2B), opening 46, interior passage 50, fuel exit orifices 52 (FIG. 3A), pilot fuel chamber 20, fuel entry orifices 54, interior passage 50, and fuel exit orifices 52 (FIG. 3B), pilot fuel chamber 20, connection passage 62, supply passage 64, one or more fuel entry orifices 54, interior passage 50, and fuel exit orifices 52 (FIG. 4), or pilot fuel chamber 20, connection passage 62, and supply passage 64 (FIG. 5).

Some configurations of injector 12 may facilitate active metering control over the supply of pilot fuel within injector 12 to nozzle 32. As described above, active metering involves the actuation of an electronically-controlled valve of injector 12. Thus, active control may include the generation of commands (e.g., as electronic signals) to cause actuation of a valve component included in injector 12. These commands may be generated based on current or predicted conditions of the engine, such as boost pressure, intake manifold temperature, coolant temperature, etc. For example, active control may include the use of a solenoid valve, such as electronically-controlled metering valve 70.

Active control over pilot fuel metering may be achieved with an electronic control module of multi-fuel engine system 10. When the supply of pilot fuel to nozzle 32 is desired, the control module may generate signals to actuate control valve 70 such that pressurized fuel is not delivered to valve control passage 66 and pressure is relieved from the hydraulic surface of metering admission valve 60. This may allow fuel from pilot fuel chamber 20 to pass through connection passage 62 and lift the valve member of metering admission valve 60, delivering fuel to locations adjacent to distal end 26. During active control, the amount of pilot fuel supplied to nozzle 32 is controlled based on the amount of time metering valve 70 is actuated. The difference between the pressure of the pilot fuel and the pressure of the primary fuel may also impact the rate at which fuel flows from connection passage 62 to supply passage 64 when metering admission valve 60 is open. In some aspects, the electronic control module may take this pressure into account when generating signals for actuating metering valve 70. For example, when pilot fuel pressure increases, metering valve 70 may be actuated for a shorter period of time to inject a given amount of fuel.

Passive metering may include control of the quantity of pilot fuel supply without generating commands to a valve of injector 12 that is associated solely with metering pilot fuel. Passive metering of pilot fuel may be achieved by use of pilot fuel pump 92 and fuel pump 96, without the inclusion of a solenoid valve for pilot fuel within fuel injector 12 (FIGS. 2A-3B). During indirect control, an electronic control unit may generate commands for pumps 92 and 96 to set the respective pressures for the pilot fuel and primary fuel. While these pressures may be adjusted to control the ratio of pilot fuel to primary fuel, it may generally be desirable to maintain the pressure of pilot fuel above the pressure of the primary fuel. The difference in pressure between the pilot and primary fuels may be increased, for example, to inject a larger amount of pilot fuel.

A step 604 may include supplying primary fuel to injector 12. Primary fuel may be supplied from fuel reservoir 95 to injector 12 via fuel pump 96 and common rail 98, as indicated above. This may include providing primary fuel to mixing volume 30 via primary fuel supply passage 36, one-way valve 35 (if present), and nozzle fuel passage 34 (FIGS. 2A-5). As indicated above, fuel pump 96 may pressurize the primary fuel to a pressure in a range of about 1 MPa to about 50 MPa, or about 35 MPa to about 60 MPa. Higher pressures are also contemplated. In at least some configurations, the pressure of the primary fuel may be maintained at a pressure that is lower than the pressure of the pilot fuel, even in situations where one or both of these pressures changes over time.

A step 606 may include at least partially mixing the pilot fuel and the diesel fuel. As indicated above, the pressure of the pilot fuel may be maintained at a pressure that is greater than a pressure of the primary fuel. Mixing may occur while valve member in the closed position and no fuel is injected. Thus, when the pilot fuel encounters the primary fuel, the pilot fuel may tend to displace the primary fuel. While a mixing location (e.g., mixing volume 30) may include the location at which the pilot and primary fuels meet when pilot fuel is first introduced, the mixing location may extend to positions farther upstream along the primary fuel path. For example, mixing may occur as far upstream as one-way valve 35 (FIGS. 2A-3B and 5). Mixing need not require homogenous distribution of the pilot and primary fuels. As used herein, the presence of a direct interface between pilot fuel and the primary fuel is considered partial mixing of these fuels.

In some configurations (FIGS. 4 and 5), fuel mixing may occur in step 606 due to the activation of an electronically-controlled valve. For example, mixing may occur while fluid is drained by actuating valve 70, allowing valve 60 to meter pilot fuel. In other configurations (FIGS. 2A-3B), mixing may occur as pilot fuel passes through pilot fuel guide space 22 (FIGS. 2A and 2B) or exits fuel exit orifices 52 (FIGS. 3A and 3B).

A step 608 may include injecting the primary fuel and the pilot fuel that were supplied and mixed in steps 602-606. Fuel injection may be performed by relieving pressure from hydraulic control chamber 42, allowing valve member 16 to lift and compress spring 18. This may be performed with an electronically-controlled valve within injector 12, such as control valve 74 (FIGS. 4 and 5). As indicated above, while not shown in FIGS. 2A-3B, control valve 74 may be present inside injector 12 to allow a control module to generate commands that result in actuation of check valve member 16. When control valve 74 is actuated, the relief of pressure from hydraulic control chamber 42 may allow fuel within pilot fuel chamber 20 to lift valve member 16 and begin the injection of fuel from nozzle openings 38.

During the injection of fuel, the pilot fuel may be injected first, although a quantity of primary fuel may be mixed with this initial pilot fuel. The pilot fuel may initially be concentrated at distal end 26 and at mixing volume 30, and may exit nozzle 32 via one or more nozzle openings 38. Primary fuel may be injected through nozzle openings 38 after most or all of the pilot fuel has been injected. Combustion of the pilot fuel, e.g., by compression-initiated ignition, may generate a flame that combusts the primary fuel injected by the same set of opening 38.

The disclosed system and method may enable injection of two different types of fuels, including a pilot fuel and a primary fuel, with a single fuel injector. The primary fuel and the pilot fuel may be pressurized and delivered to the injector via respective common rails. In particular, the disclosed system and method may provide a common-rail dual fuel injector with a single tip for injecting two different fuels from a single set of orifices. Additionally, injection of both fuels may be achieved via a single check valve member at the distal end of the injector. Passive metering of pilot fuel (e.g., diesel fuel) may be performed with the matching clearance of the nozzle, or by a hollow check at the bottom of the tip. If desired, active metering of pilot fuel may be achieved with a solenoid valve. Each configuration may facilitate fuel mixing prior to injection, while the fuel injected at the start of an injection event provides a sufficient amount of pilot fuel for initiating complete ignition of the primary fuel.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A fuel injector capable of injecting a plurality of different fuels in a single fuel injection event, the fuel injector comprising:
   a nozzle at an end of the fuel injector, the nozzle having a tip;
   openings in the tip of the nozzle through which fuel is configured to be injected;
   a check valve member with a tip located within the nozzle, the check valve member being movable between an injection position in which fuel is injected via the openings and a closed position in which the openings are closed, the check valve member including a valve body at least partially surrounded by a spring biasing the check valve member to the closed position;
   a primary fuel path within the fuel injector configured to supply a primary fuel which is a first liquid fuel to the openings in the tip of the nozzle;
   a pilot fuel path within the fuel injector configured to supply a pilot fuel, which is a second liquid fuel different than the first liquid fuel, to the openings in the tip of the nozzle; and
   a mixing volume within the nozzle and connecting the primary fuel path and the pilot fuel path when the check valve member is in the closed position, the mixing volume surrounding at least a portion of the valve body, the mixing volume configured to mix the primary fuel and the pilot fuel when the check valve member is in the closed position.

2. The fuel injector of claim 1, further including a one-way valve configured to permit a flow of the primary fuel towards the mixing volume and block a flow of the pilot fuel away from the mixing volume.

3. The fuel injector of claim 1, wherein the check valve member is entirely solid.

4. The fuel injector of claim 3, further including a pilot fuel admission valve connected upstream of the mixing volume.

5. The fuel injector of claim 1, wherein the check valve member includes an interior passage that forms part of the pilot fuel path.

6. The fuel injector of claim 5, wherein the check valve member includes an open proximal end.

7. The fuel injector of claim 5, wherein the check valve member includes at least one fuel entry orifice extending through a side wall of the check valve member.

8. The fuel injector of claim 5, further including a pilot fuel admission valve connected upstream of the interior passage.

9. The fuel injector of claim 1, wherein the second liquid fuel does not include the first liquid fuel.

10. A fuel injection method, comprising:
    supplying a pilot fuel to a nozzle of a fuel injector, wherein the pilot fuel is a liquid fuel;
    supplying a primary fuel to the nozzle, the pilot fuel being a different liquid fuel than the primary fuel, wherein neither the primary fuel nor the pilot fuel includes a same fuel as one another;
    at least partially mixing the pilot fuel and the primary fuel in the nozzle before either the primary fuel or the pilot fuel is injected with the nozzle, and while the fuel injector is in a closed configuration,
    wherein a spring surrounds at least a portion of the valve member to bias an end of the valve member towards the nozzle, thereby biasing the fuel injector to the closed configuration; and
    injecting the pilot fuel and the primary fuel through a single set of openings in the nozzle.

11. The fuel injection method of claim 10, wherein the pilot fuel is supplied to the fuel injector by a common rail and the primary fuel is supplied to the fuel injector by a common rail.

12. The fuel injection method of claim 11, wherein a pressure of the pilot fuel supplied to the fuel injector is greater than a pressure of the primary fuel supplied to the fuel injector.

13. The fuel injection method of claim 10, further including actuating an electronically-controlled valve of the fuel injector to cause the supply of the pilot fuel to the nozzle.

14. The fuel injection method of claim 13, further including actuating an additional electronically-controlled valve of the fuel injector to inject the pilot fuel and the primary fuel through the single set of openings.

15. The fuel injection method of claim 10, wherein the pilot fuel is supplied to the nozzle through an interior of a check valve member.

16. The fuel injection method of claim 10, wherein the pilot fuel is supplied to the nozzle at a location that is outside of a check valve member.

17. A fuel injection system, comprising:
    a first common rail configured to receive a pilot fuel;
    a second common rail configured to receive a primary fuel; and
    a fuel injector having:
      a nozzle;
      a check valve member extending within the nozzle, the check valve member including a valve body having a portion which is surrounded by a spring;
      a primary fuel path configured to supply a primary fuel to the nozzle, wherein the primary fuel comprises a first liquid fuel; and
      a pilot fuel path within the fuel injector configured to supply a pilot fuel to openings in the nozzle, wherein the pilot fuel comprises a second liquid fuel different than the first liquid fuel, the primary fuel path being fluidly connected to the pilot fuel path when the check valve member is in a closed position that prevents injection of the pilot fuel and injection of the primary fuel, the pilot fuel and the primary fuel configured to mix in the fuel injector prior to injection.

18. The fuel injection system of claim 17, wherein the pilot fuel path includes a clearance between the check valve member and an interior of the check valve member.

19. The fuel injection system of claim 17, wherein the pilot fuel path extends through at least a portion of the check valve member.

20. The fuel injection system of claim 17, wherein the fuel injector further includes an electronically-controlled metering valve that, when actuated, causes a supply of pilot fuel via the pilot fuel path.

\* \* \* \* \*